US012259733B2

(12) United States Patent
Vishnu et al.

(10) Patent No.: US 12,259,733 B2
(45) Date of Patent: Mar. 25, 2025

(54) SPATIAL BLIND SPOT MONITORING SYSTEMS AND RELATED METHODS OF USE

(71) Applicant: Anram Holdings, Oakville (CA)

(72) Inventors: Ajay Vishnu, Gurgaon (IN); Arijit Saha, Kolkata (IN); Rohit Verma, Gurgaon (IN)

(73) Assignee: ANRAM HOLDINGS, Mississauga (CA)

( * ) Notice: Subject to any disclaimer, the term of this patent is extended or adjusted under 35 U.S.C. 154(b) by 411 days.

(21) Appl. No.: 17/510,188

(22) Filed: Oct. 25, 2021

(65) Prior Publication Data

US 2022/0129006 A1  Apr. 28, 2022

(30) Foreign Application Priority Data

Oct. 24, 2020  (IN) .............................. 202011046475

(51) Int. Cl.
*G05D 1/00* (2024.01)
*G01S 17/87* (2020.01)
(Continued)

(52) U.S. Cl.
CPC ............ *G05D 1/0255* (2013.01); *G01S 17/87* (2013.01); *G01S 17/89* (2013.01); *G01S 17/931* (2020.01);
(Continued)

(58) Field of Classification Search
CPC .. G05D 1/0255; G05D 1/0088; G05D 1/0219; G05D 1/0223; G05D 2201/0207; G01S 17/931; G01S 17/87; G01S 17/89
See application file for complete search history.

(56) References Cited

U.S. PATENT DOCUMENTS

2021/0026368 A1* 1/2021 Cochran .............. G05D 1/0246
2023/0157505 A1* 5/2023 Shim .................... G05D 1/0272
15/320

FOREIGN PATENT DOCUMENTS

CN        111007528        4/2020
CN        211466457 U  *   9/2020  ........... G01S 15/931
(Continued)

OTHER PUBLICATIONS

KR1998-019839A machine translation (Year: 1998).*
(Continued)

*Primary Examiner* — Anne Marie Antonucci
*Assistant Examiner* — Jingli Wang
(74) *Attorney, Agent, or Firm* — Mannava & Kang, P.C.

(57) ABSTRACT

Embodiments of the present disclosure provide a system and a method of controlling a robot for autonomous navigation. The method includes receiving a set of point values defining LIDAR data from a LIDAR sensor scanning a 2D omnidirectional plane, receiving a sensor value from an ultrasonic sensor having a 3D field of view excluding the plane, and resolving an observable field of view for the LIDAR sensor, where the observable field of view includes a blind spot of the LIDAR sensor, and modifying the LIDAR data using the sensor value based on the object being located in the blind spot indicated by the sensor value less than one or more point values corresponding to a portion of the plane extending along the observable field of view, where the modified LIDAR data indicates the object being detected by the LIDAR sensor despite the object located outside the 2D field of view.

20 Claims, 9 Drawing Sheets

(51) Int. Cl.
*G01S 17/89* (2020.01)
*G01S 17/931* (2020.01)

(52) U.S. Cl.
CPC ......... *G05D 1/0088* (2013.01); *G05D 1/0219* (2013.01); *G05D 1/0223* (2013.01)

(56) References Cited

FOREIGN PATENT DOCUMENTS

| KR | 1998-019839 A | * | 6/1998 |
| KR | 19980019839 | | 6/1998 |

OTHER PUBLICATIONS

CN-211466457-U machine translation (Year: 2020).*
Stabilization and Validation of 3D Object Position Using Multimodal Sensor Fusion and Semantic Segmentation (Year: 2020).*

* cited by examiner

SPATIAL BLIND SPOT MONITORING SYSTEMS AND RELATED METHODS OF USE

PRIORITY

The present application claims priority under 35 U.S.C. 119 (a)-(d) to Indian Patent Application number 202011046475, having a filing date of Oct. 24, 2020, the disclosure of which is hereby incorporated by reference in its entirety.

TECHNICAL FIELD

The present disclosure generally relates to autonomous robots and particularly relates to spatial blind spot monitoring systems for autonomous robots.

BACKGROUND

Autonomous robots require reliable object detection for performing various tasks, including environment mapping, path planning, motion planning, and navigation. Most modern autonomous robots usually rely on a camera, alone or in combination with another sensor, to scan and detect objects in the surrounding environment. The camera is often used to assist in scanning blind spots of such sensor, or vice versa, for object detection. However, such camera-reliant solutions for monitoring the blind spots or for object detection, in general, are computationally intensive, prone to errors due to changes in ambient light conditions, and require costly hardware.

SUMMARY

Autonomous robots may employ different types of low-cost proximity sensors operating in tandem to monitor related blind spots for object detection without using data from a camera. One example of such low-cost proximity sensors includes an ultrasonic sensor and a two-dimensional (2D) light detection and ranging (LIDAR) sensor. Unlike the camera and other three-dimensional (3D) scanners such as radar and 3D-LIDAR, the ultrasonic and 2D LIDAR sensors are cost-effective and computationally light for object detection.

The 2D LIDAR sensor has a 2D field of view and operates to emit light pulses for detecting an object in a 2D spatial plane. On the other hand, the ultrasonic sensor has a 3D field of view and emits sound pulses for object detection in a 3D space. Both the 2D LIDAR sensor and the ultrasonic sensor operate as time-of-flight sensors that send the corresponding pulses into a surrounding environment and use the pulses received back after being reflected or bounced off a surface to indicate the presence of an object. The time taken by the respective pulses to return is used by the 2D LIDAR sensor to output LIDAR data and by the ultrasonic sensor for providing ultrasonic data. Both the LIDAR data and the ultrasonic data provide distance measurements to objects in the surrounding environment. The ultrasonic sensor may assist in monitoring blind spots of the 2D LIDAR sensor and that of an autonomous robot associated therewith to reliably detect an object as per required tasks such as environment mapping, path planning, motion planning, and navigation.

Typically, the ultrasonic sensor is oriented to have a field of view (or a signal pathway) intersecting with that of the 2D LIDAR sensor, or vice versa, to monitor the blind spots. However, the intersecting field of views (or signal pathways) increase the noise in the received LIDAR and ultrasonic data to complicate signal/data processing tasks and enhance the computational burden. Moreover, such intersections may reduce the respective scanning ranges and/or field of views of underlying sensors to, in turn, create peripheral blind spots and limit the spatial extent of these sensors to detect objects. Further, the LIDAR and ultrasonic data are generally used to create and/or update a map of the environment based on the detection of objects while the autonomous robot is navigating. However, the LIDAR data and the ultrasonic data are often processed separately to create or update different maps for the same position in space. These maps are then either fused or compared for object detection. Such separate processing of the LIDAR and ultrasonic data increases the memory usage and processing delay for object detection. Therefore, there is a need for a robust configuration of low-cost proximity sensors and related methods to monitor sensor blind spots and reliably detect objects across multiple spatial planes without amplifying the computational overhead and memory usage.

One embodiment of the present disclosure includes a method of controlling a robot for autonomous navigation. The method comprises receiving, by the controller, a set of point values defining LIDAR data from a LIDAR sensor having a 2D field of view, the point values being distance values received based on the LIDAR sensor performing a scan the environment, where the scan may be performed in an omnidirectional plane comprising the 2D field of view; receiving, by the controller, a sensor value from an ultrasonic sensor having a 3D field of view, the sensor value being a measure of distance to an object and received based on the ultrasonic sensor scanning the environment, where the 3D field of view excludes the omnidirectional plane; resolving, by the controller, an observable field of view for the LIDAR sensor, the observable field of view including a blind spot of the LIDAR sensor, where the observable field of view is resolved based on a sensor distance between the LIDAR sensor and the ultrasonic sensor, the received sensor value, and the 3D field of view of the ultrasonic sensor; comparing, by the controller, the sensor value with one or more point values in the set, the one or more point values corresponding to a portion of the omnidirectional plane, where the portion extends along the observable field of view; determining, by the controller, whether the object is located in the blind spot of the LIDAR sensor based on the comparison, where the object is determined to be located in the blind spot based on the sensor value being less than the one or more point values in the set; modifying, by the controller, the LIDAR data based on the object being located in the blind spot, the LIDAR data being modified by replacing the one or more point values in the set with the sensor value, where the modified LIDAR data indicates the object being detected by the LIDAR sensor despite the object being located outside the 2D field of view; and generating, by the controller, a control signal based on the modified LIDAR data, where the control signal triggers a motor for manipulating an orientation of the robot towards a path away from the object.

Another embodiment of the present disclosure includes a system for controlling a robot for autonomous navigation. The system comprises a LIDAR sensor, an ultrasonic sensor, and a controller operating in communication therewith. The LIDAR sensor may have a 2D field of view and being configured to perform a scan of the environment to provide a set of point values defining LIDAR data, the set of point values being distance values, where the LIDAR sensor performs the scan in an omnidirectional plane comprising the 2D field of view. The ultrasonic sensor may be configured to scan of the environment to provide a sensor value, the sensor value being a measure of distance to an object and received based on the ultrasonic sensor scanning the environment, where the ultrasonic sensor has a 3D field of view excluding the omnidirectional plane. The controller may be configured to: resolve an observable field of view for the LIDAR sensor, the observable field of view including a blind spot of the LIDAR sensor, where the observable field of view is resolved based on a sensor distance between the LIDAR sensor and the ultrasonic sensor, the sensor value, and the 3D field of view of the ultrasonic sensor; compare the sensor value with one or more point values in the set, the one or more point values corresponding to a portion of the omnidirectional plane, where the portion extends along the observable field of view; determine whether the object is located in the blind spot of the LIDAR sensor based on the comparison, where the object is determined to be located in the blind spot based on the sensor value being less than the one or more point values in the set; modify the LIDAR data based on the object being located in the blind spot, the LIDAR data being modified by replacing the one or more point values in the set with the sensor value, where the modified LIDAR data indicates the object being detected by the LIDAR sensor despite the object being located outside the 2D field of view; and generate a control signal based on the modified LIDAR data, where the control signal triggers a motor for manipulating an orientation of the robot towards a path away from the object.

The above summary of exemplary embodiments is not intended to describe each disclosed embodiment or every implementation of the present disclosure. Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, apparatuses, systems, and methods that are consistent with the subject matter as claimed herein.

DETAILED DESCRIPTION

Figure 1:
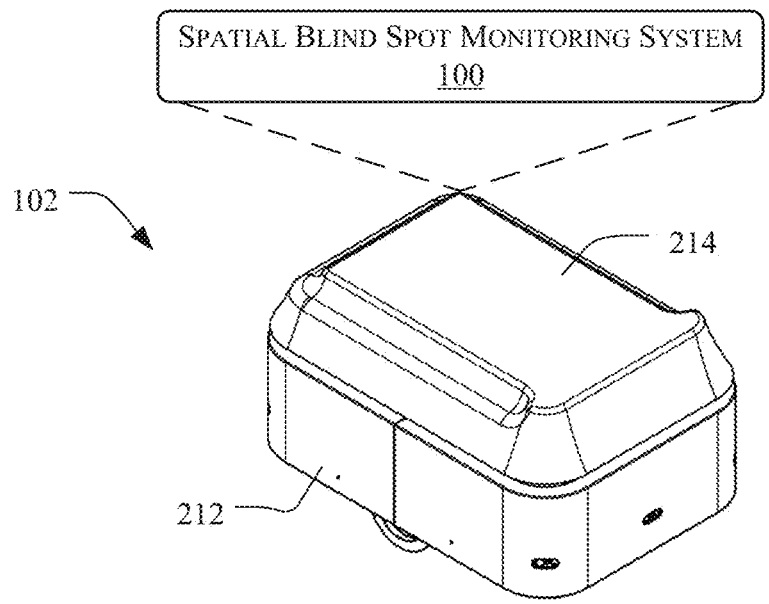
FIG. 1 is a perspective view of a mobile robot including an exemplary spatial blind spot monitoring (SBSM) system, according to an embodiment of the present disclosure.

The following detailed description is provided with reference to the drawings herein. Exemplary embodiments are provided as illustrative examples so as to enable those skilled in the art to practice the disclosure. It will be appreciated that further variations of the concepts and embodiments disclosed herein can be contemplated. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered. The term "approximately" means+/−5% of the stated number.

Further, where certain elements of the present disclosure can be partially or fully implemented using known components, only those portions of such known components that are necessary for an understanding of the present disclosure will be described, and detailed descriptions of other portions of such known components will be omitted so as not to obscure the novel aspects. In the present disclosure, an embodiment showing a singular component should not be considered limiting; rather, the present disclosure is intended to encompass other embodiments including a plurality of the same component, and vice-versa, unless explicitly stated otherwise herein. Moreover, the applicant(s) does not intend for any term in the description herein to be ascribed an uncommon or special meaning unless explicitly set forth as such. The present disclosure also encompasses present and future known equivalents to the components referred to herein.

Embodiments are disclosed in the context of automated navigation across a designated space; however, one having ordinary skill in the art would understand that the concepts described herein may be implemented for various other applications including, but are not limited to, environment mapping, path or motion planning of an autonomous robot, tracking, and animation in various business, social, and personal scenarios. Examples of such scenarios may include, but are not limited to, item tracking across multiplanar checkpoints in a factory or a warehouse; medicine or item delivery; disinfection of indoor surfaces; food transfers in a restaurant; social interactions through telepresence devices or service carts in indoor locations; and observing animal movements in farms.

FIG. 1 is a perspective view of a mobile robot 102 including an exemplary spatial blind spot monitoring (SBSM) system 100, according to an embodiment of the present disclosure. The particular implementation of the mobile robot 102 is provided for illustrative purposes only and should not be limited to any specific physical architecture for implementing the SBSM system 100.

In on embodiment, the SBSM system 100 may represent a wide variety of devices or systems capable of monitoring multiple spatial planes for object detection. One aspect of the SBSM system 100 may provide to compensate for an obstructed field of view or a blind spot of a proximity sensor. Another aspect of the SBSM system 100 may include monitoring an intended spatial plane relative to a frame of reference. Still another aspect of the SBSM system 100 may include different types of sensors, including at least one proximity sensor, cooperating with each other to monitor an intended spatial plane either independently or relative to robot components, objects, or motions in the vicinity of the SBSM system 100. In the present disclosure, references to a sensor may include an independent sensor, a sensor array, a sensor device comprising additional components, a sensor device array, or any combinations thereof.

The SBSM system 100 may operate in communication with any of a variety of computing devices (not shown) known in the art, related art, or developed later over a network (not shown). Examples of the computing devices may include, but are not limited to, desktop computers, personal digital assistants, servers, mainframe computers, mobile computing devices (e.g., mobile phones, laptops, remote controller 208s, etc.), and Internet appliances.

The SBSM system 100 may be installed, integrated, or operatively associated with a standalone and/or dedicated device including hardware and installed software, where the hardware is closely matched to the requirements and/or functionality of the software. Some embodiments may include the SBSM system 100 including software, firmware, or other resources that support remote administration, operation, and/or maintenance of the mobile robot 102. In some other embodiments, the SBSM system 100 may operate, or not operate, in response to wearable, portable, and/or moveable components or devices.

Aspects of the mobile robot 102 implementing the SBSM system 100 may also include a variety of known, related art, or later developed interface(s), including software interfaces (e.g., an application programming interface, a graphical user interface, etc.); hardware interfaces (e.g., cables, cable connectors, a keyboard, a card reader, a barcode reader, a scanner, an interactive display screen, a printer, temperature sensors, moisture sensors, light sensors, disinfection sensor, odometer, gyroscope, magnetometer, accelerometers, or any other types of sensors commensurate with the predefined or dynamically defined functions of the mobile robot 102, etc.); or both. The interface(s) may facilitate communication between various devices or components operationally connected with the SBSM system 100. In some embodiments, the interface(s) may facilitate communication with computing devices capable of interacting with the mobile robot 102 over the network. In further embodiments, the mobile robot 102, either in communication with any of a variety of network devices such as the computing devices or dedicatedly, may have video, voice, or data communication capabilities.

In one embodiment (FIGS. 2-4), the SBSM system 100 may include a two-dimensional (2D) LIDAR sensor 202, one or more ultrasonic sensors 204-1a, 204-2a, 204-3a, 204-4b, and 204-b (hereinafter collectively referred to as ultrasonic sensors 204), a base link 206, and a controller 208, which may be mounted on the mobile robot 102. The 2D LIDAR sensor 202 and the ultrasonic sensors 204 (collectively, referred to as multiplanar sensors) may have a 2D field of view and a three-dimensional (3D) field of view respectively. In one embodiment, the 2D LIDAR sensor 202 and the ultrasonic sensors 204 may operate to monitor distinct spatial planes. For example, the 2D LIDAR sensor 202 and the ultrasonic sensor 204-2a may be located or oriented in a manner such that the 3D field of view excludes a 2D spatial plane monitored by the 2D field of view of the 2D LIDAR sensor 202. The 2D LIDAR sensor 202 may scan a first spatial plane extending to a first range greater than a predefined reference range, e.g., approximately 5 meters from mobile robot 102. The predefined reference range may be set based on an intended application of the SBSM system 100. On the other hand, the ultrasonic sensor 204-2a may have a second range being less than or equal to the predefined reference range. One having ordinary skill in the art will appreciate that the multiplanar sensors may additionally include or operate with other types of sensors (e.g., temperature sensors, humidity sensors, voltage/current sensors, ultraviolet sensors, imaging sensors, inertial sensors, etc.) known in the art. The multiplanar sensors may be oriented to scan non-intersecting spatial planes relative to the base link 206.

Figure 2:
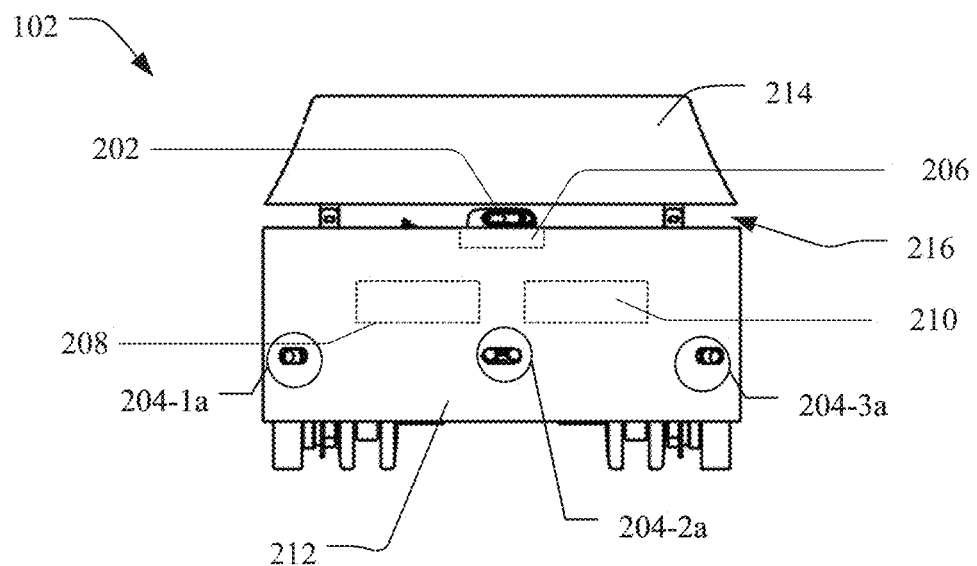
FIG. 2 is a front elevation view of the mobile robot illustrating components of the SBSM system of FIG. 1, according to an embodiment of the present disclosure.
Figure 3:
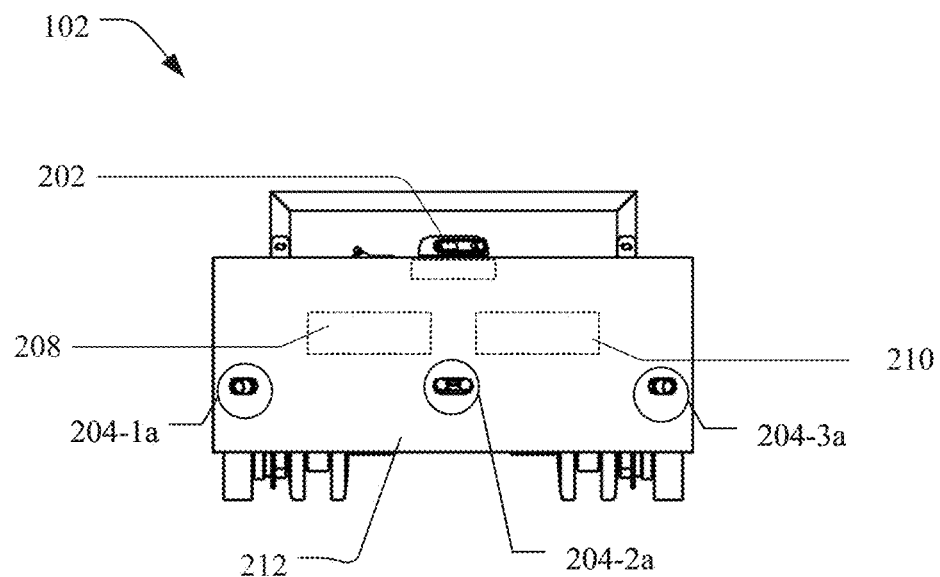
FIG. 3 is a front elevation view of the mobile robot of FIG. 1 without a top cover, according to an embodiment of the present disclosure.
Figure 4:
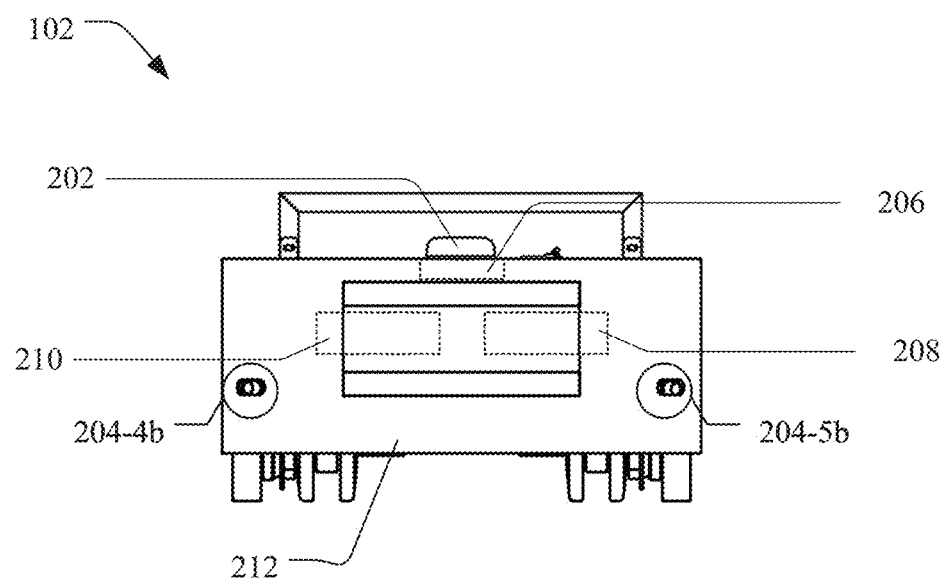
FIG. 4 is a rear elevation view of the mobile robot of FIG. 3, according to an embodiment of the present disclosure.

Further, the base link 206 may provide a frame of reference for the SBSM system 100 and/or the robot 102. The base link 206 may define an origin point of the robot 102, where the origin point may correspond to a predefined location on the robot 102 having spatial coordinates (0,0,0) relative to a frame of reference of the base link 206. In some examples, the origin point may correspond to a center (e.g., center of mass or geometric center) of the robot 102. The base link 206 may correspond to a component of the robot 102. In one example, as shown in FIGS. 2-4, the base link 206 may include a portion of a chassis or frame of the mobile robot 102 supporting the 2D LIDAR sensor 202. In some examples, the base link 206 may comprise one of multiplanar sensors such as the 2D LIDAR sensor 202. Further examples may include the base link 206 being implemented with any passive or active component known in the art, related art, or developed later operationally connected to the multiplanar sensors. The base link 206, in communication with the controller 208, may assist to determine relative positions of the multiplanar sensors on the robot 102 and a position of the robot 102 in a map of an environment such as a room, where the robot 102 may be located.

The controller 208 may correspond to an electronic or an electromechanical component operating to control predefined or dynamically defined functions of various components including, but are not limited to, the multiplanar sensors, the base link 206, one or more apparatuses, and any components or devices coupled thereto. The controller 208 may be implemented by way of a single device (e.g., a computing device, processor or an electronic storage device) or a combination of multiple devices. The controller 208 may be implemented in hardware or a suitable combination of hardware and software. The "hardware" may comprise a combination of discrete electronic or electromechanical components, an integrated circuit, an application-specific integrated circuit, a field programmable gate array, a digital signal processor, or other suitable hardware. The "software"

may comprise one or more objects, agents, threads, lines of code, subroutines, separate software applications, two or more lines of code or other suitable software structures operating in one or more software applications. For example, the controller 208 may execute machine readable program instructions for processing signals received from one or more components of the SBSM system 100 including the multiplanar sensors, or any other components or devices operationally coupled thereto.

The controller 208 may include, for example, microprocessors, microcomputers, microcontrollers, digital signal processors, central processing units, state machines, logic circuits, and/or any devices that may manipulate signals based on operational instructions. Among other capabilities, the controller 208 may be configured to fetch and execute computer readable instructions in communication with a storage device (not shown). The storage device may be configured to store, manage, or process at least one of data in a database related to or from the SBSM system 100 and various devices coupled to the controller 208 along with associated communications including instructions, queries, data, and related metadata.

The storage device may comprise of any computer-readable medium known in the art, related art, or developed later including, for example, volatile memory (e.g., RAM), non-volatile memory (e.g., flash drive), disk drive, etc., or any combination thereof. Examples of the storage device may include, but not limited to, a storage server, a portable storage device (e.g., a USB drive, an external hard drive, etc.), and so on. The server may be implemented as any of a variety of computing devices including, for example, a general-purpose computing device, multiple networked servers (arranged in clusters or as a server farm), a mainframe, or so forth.

Further, in some embodiments, the controller 208 may be configured to convert communications, which may include instructions, queries, data, etc., from one or more devices including the multiplanar sensors into appropriate formats to make these communications compatible with a third-party data application, network devices, or interfaces, and vice versa. Consequently, the controller 208 may allow implementation of the storage device using different technologies or by different organizations, e.g., a third-party vendor, managing the storage device using a proprietary technology. Further, the controller 208 may operate to control various components of the mobile robot 102 for autonomous operation.

As illustrated in FIGS. 2-4, the mobile robot 102 may include a mobile portion 212 and a payload portion 214 operationally coupled thereto. The mobile portion 212 may include a set of parts to guide, control, support, and/or drive the payload portion 214. The mobile portion 212 may be integrated or operatively connected with the payload portion 214 using any suitable connection mechanisms known in the art, related art, or developed later. The payload portion 214 may include a platform for supporting or carrying any suitable physical payloads in accordance with intended applications. Examples of such physical payloads may include, but are not limited to, devices/components, tools, vehicles, supplies, containers, and humans or animals.

The payload portion 214 may be located above the mobile portion 212; however, other examples may include the payload portion 214 being arranged along a lower surface, e.g., a bottom surface, or a lateral surface of the mobile portion 212. In some examples, the payload portion 214 may be arranged within the mobile portion 212. The payload portion 214 may be arranged to keep a gap 216 between the platform and the mobile portion 212.

Figure 5:
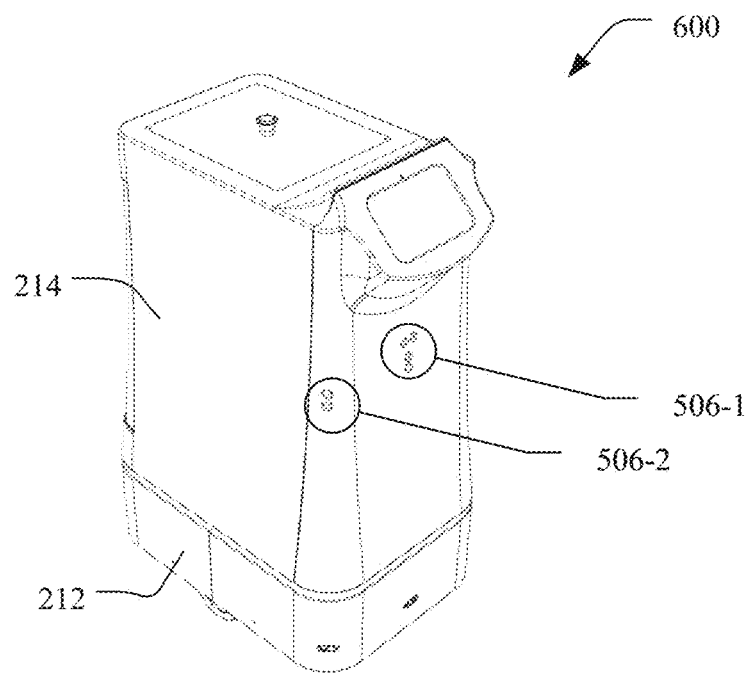
FIG. 5 is a perspective view of a payload robot including the mobile robot of FIG. 3, according to an embodiment of the present disclosure.
Figure 6:
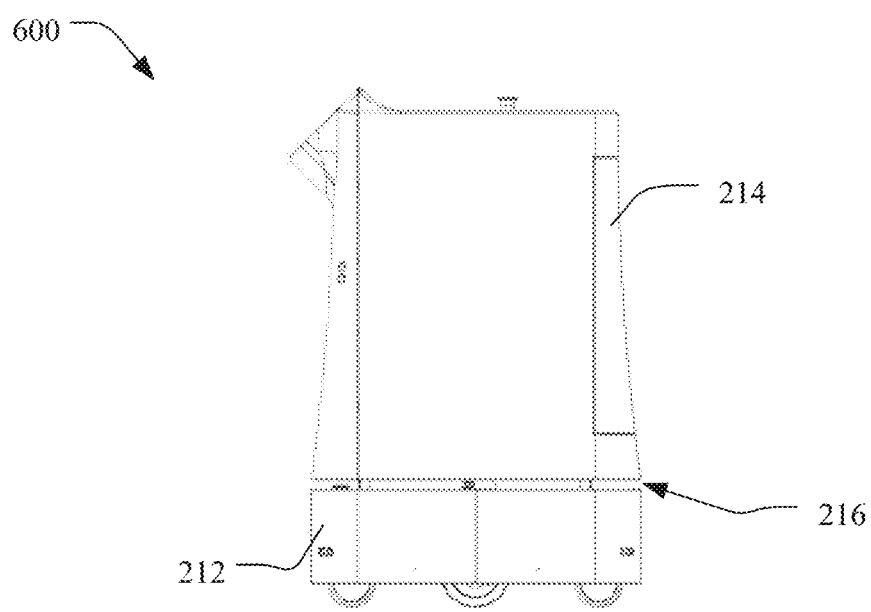
FIG. 6 is a right-side elevation view of the payload robot of FIG. 5, according to an embodiment of the present disclosure.

For example, as illustrated in FIG. 2, the payload portion 214 may be supported on the mobile portion 212. The payload portion 214 may be segregated from the mobile portion 212, or a cabinet thereof, to create the gap 216 therebetween. The gap 216 may be exposed to the ambient environment. Other examples may include both the payload portion 214 and the mobile portion 212 being enclosed or encased by a transparent housing having such gap 216 (or an opening) arranged between the payload portion 214 and the mobile portion 212. In further embodiments, the payload portion 214 may be configured to move relative to the mobile portion 212 using any suitable mechanisms known in the art, related art, or developed later. For example, the payload portion 214, or any part thereof such as the platform, may extend horizontally or vertically along a predetermined axis of the mobile portion 212. Other examples may include the payload portion 214, or any part thereof, may rotate about the predetermined axis of the mobile portion 212. Such predetermined axis may be aligned with a central axis or a lateral axis of the mobile portion 212. In some embodiments, the payload portion 214 may be at least in-part segregated from the mobile portion 212. For example, as illustrated in FIGS. 5-6, a payload robot 600 may include the payload portion 214 as a first apparatus 702 and the mobile portion 212 as the second apparatus 704.

The mobile portion 212 may be coupled to mobility devices, e.g., motorized wheels, to assist in spatially navigating the mobile robot 102 including the SBSM system 100 within a designated space such as an indoor space (e.g., a room) or an outdoor space (e.g., a courtyard, a field, a road, etc.). In one embodiment, the mobile portion 212 may be configured to operate or move autonomously. Other embodiments may include the mobile portion 212 being configurable for being moved manually or automatically by any remote computing devices known in the art.

The mobile portion 212 may further include the chassis mounted therewith. The chassis may provide a frame having suitable configurations including, but not limited to, shape, size, connectors, and/or openings to mount or support various components therewith. For example, the chassis may include a lower frame (not shown) and an upper frame 302 extending therefrom. The lower frame may support or couple to various operational components, including wheels, components of the SBSM system 100, and a motor 210, for effecting mobility to the mobile robot 102. The lower frame may be encased or enclosed within the cabinet with the upper frame 302 extending out therefrom. In one embodiment, at least one ultrasonic sensor 204-2a may be removably secured with the cabinet using any suitable connection mechanisms known in the art. For example, multiple ultrasonic sensors 204 a, b, c, a, and b (hereinafter collectively referred to as ultrasonic sensors 204) may be removably secured along an outer periphery of the cabinet at desired positions. The ultrasonic sensors 204-1a, 204-2a, and 204-3a (hereinafter collectively referred to as front sensors 204a) may be oriented towards a front of the cabinet and the ultrasonic sensors 204-4b and 204-4b (hereinafter collectively referred to as rear sensors 204-b) may be oriented towards a rear of the cabinet. In another embodiment, the ultrasonic sensors 204 (e.g., primary ultrasonic sensors 204) may be removably secured or coupled to any other components of the mobile robot 102. Examples of these components may include, but are not limited to, the lower frame, the upper frame 302, and the payload portion 214. In another instance, as shown in FIG. 5-6, the payload robot 600 or the first apparatus 702 may include ultrasonic sensors 506-1, 506-2 (collectively referred to as ultrasonic sensors 506). The ultrasonic sensors 506 may be located above the base link 206 and the 2D LIDAR sensor 202. The ultrasonic sensors 506 may be oriented along a front surface of the first apparatus 702. Each of the ultrasonic sensors 506 may configured to have a 3D field of view towards a front of the first apparatus 702.

Each of the front sensors may be arranged below the base link 206. The front sensors may be arranged in the same horizontal plane and different vertical planes; however, as shown in FIGS. 5-6, in other examples, one or more of the front sensors may be arranged in the same vertical plane and/or different horizontal planes relative to the remaining front sensors.

Further, the ultrasonic sensor 204-1a, 204-2a and 204-3a may be arranged proximate to corners of the cabinet, or generally oblique relative to the base link 206, towards a front section, and/or a section lateral thereto, of the mobile portion 212. Similar to the front sensors, the rear sensors 204-b may include the corresponding ultrasonic sensors being located in the same horizontal plane but different vertical planes below the base link 206. The rear sensors 204-b may be arranged proximate to corners of the cabinet, or generally oblique relative to the base link 206, towards a rear section, and/or a section lateral thereto, of the mobile robot 102.

Each of the ultrasonic sensors 204 may be oriented to monitor a distinct 3D space. For example, each of the ultrasonic sensors 204 and 506 may have a 3D field of view including a three-dimensional (3D) space, or multiple 2D planes, extending up to a preset range such as the second range. The second field of view of an ultrasonic sensor 204-2a may refer to an ultrasonic angle therefrom within which the ultrasonic sensor 204-2a may be able detect an object. In one example, the ultrasonic angle may include a horizontal angle, and/or a vertical angle, extending up to approximately 20 degrees; however, in other examples, the ultrasonic angle may range from approximately 10 degrees to approximately 60 degrees. The 3D field of view in combination with the second range may provide a second scanning region corresponding to each of the ultrasonic sensors 204, 506. One having ordinary skill in the art will understand that the ultrasonic sensors 204, 506 may be selected to have the same or different field of views, detection ranges, and scanning regions depending on the intended applications.

Further, the upper frame 302 may include a lower section and an upper section (hereinafter collectively referred to as frame sections). The frame sections may be positioned along an upper surface of the cabinet and about a predefined vertical axis of the mobile portion 212. Both the frame sections may be located outside the cabinet; however, in some embodiments, at least one of the frame sections may be located within the cabinet. The upper section may removably secure, or support, the payload portion 214 for being mounted on a top surface of the upper frame 302. In some embodiments, the top surface of the upper frame 302 may provide a platform for carrying or supporting physical payloads. The upper section may be arranged at a suitable elevation to expose the lower section through the gap 216 between the payload portion 214 and the mobile portion 212. On the other hand, the lower section may removably secure the 2D LIDAR sensor 202. In other instances, the 2D LIDAR sensor 202 may be removably secured with any other components of the mobile robot 102 using any suitable connection mechanisms known in the art. Examples of these components may include, but are not limited to, the upper section and the payload portion 214.

Further, in one embodiment, the 2D LIDAR sensor 202 may be implemented as a rotational scanner operating to perform a 360-degree scan (also, referred to as an omnidirectional scan) about the mobile portion 212. For instance, the 2D LIDAR sensor 202 may emit pulsed optical signals through a gap 216, such as the gap 216, in the mobile robot 102 or the payload robot 600. The 2D LIDAR sensor 202 may have a 2D field of view extending in a predefined 2D omnidirectional plane up to the first range. The 2D field of view of the 2D LIDAR sensor 202 may refer to a LIDAR angle therefrom within which the 2D LIDAR sensor 202 may be able to detect an object. In one example, the LIDAR angle may include a horizontal angle extending up to approximately 360 degrees; however, examples may include the horizontal angle may be less than approximately 360 degrees. The first field of view in combination with the preset first range may provide a first scanning region of the 2D LIDAR sensor 202. The 2D LIDAR sensor 202 may be oriented to have the 2D field of view extending across the predefined 2D plane set parallel to a horizontal plane of the mobile portion 212 and/or the base link 206. The 2D LIDAR sensor 202 may operate to extend the 2D field of view to a 2D plane in the region, at least partially, encircling the mobile portion 212, or a part thereof, and assist to generate a 2D point cloud data. In one example, the 2D LIDAR sensor 202 may be positioned at a predefined elevation or segregation of approximately at least 15 cm from the ultrasonic sensors 204 (and e.g., 22 cm from the ground) to avoid the 2D plane from intersecting with the multiplanar space covered by the 3D field of view of the ultrasonic sensors 204, 506. The 2D LIDAR sensor 202 may be positioned to avoid such intersection at least up to the second range (or maximum detection range) of the ultrasonic sensors 204. Moreover, the elevation or segregation of the 2D LIDAR sensor 202 may be preset or dynamically set for being arranged relative to the ultrasonic sensors 204 and/or the base link 206.

The 2D LIDAR sensor 202 and the ultrasonic sensors 204 may operate in communication with the controller 208 and a power supply (not shown). The ultrasonic sensors 204 may assist in monitoring blind spots of the 2D LIDAR sensor 202 in the SBSM system 100 for object detection.

Figure 7:
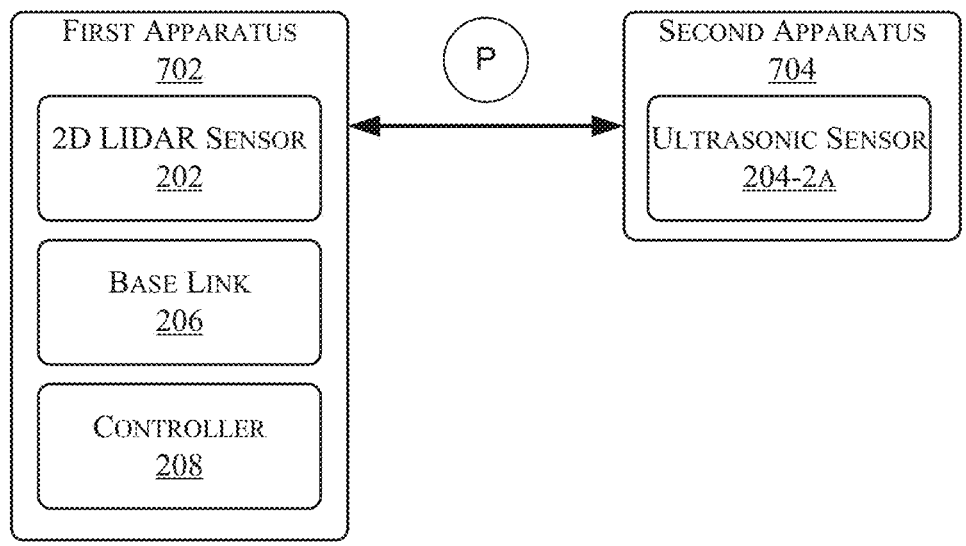
FIGS. 7-10 illustrate exemplary configurations of the SBSM system of FIG. 1 implemented across multiple apparatuses, according to an embodiment of the present disclosure.

Further, illustrated in FIGS. 7-10, the SBSM system 100 may be implemented to have different configurations. For example, the SBSM system 100 may be installed or integrated with a single apparatus, hereinafter collectively referred to as a single apparatus system, as illustrated in FIG. 1. However, in some embodiments, the SBSM system 100 may be operationally coupled to multiple apparatuses, e.g., including the first apparatus 702 and the second apparatus 704, hereinafter collectively referred to as multi-apparatus system. For example, as illustrated in FIG. 7, the 2D LIDAR sensor 202 and the base link 206 may be installed or integrated with the first apparatus 702 (e.g., the mobile robot 102) and the ultrasonic sensor 204-2a may be installed or integrated with the second apparatus 704 (e.g., payload robot 600 in FIGS. 5-6).

Figure 8:
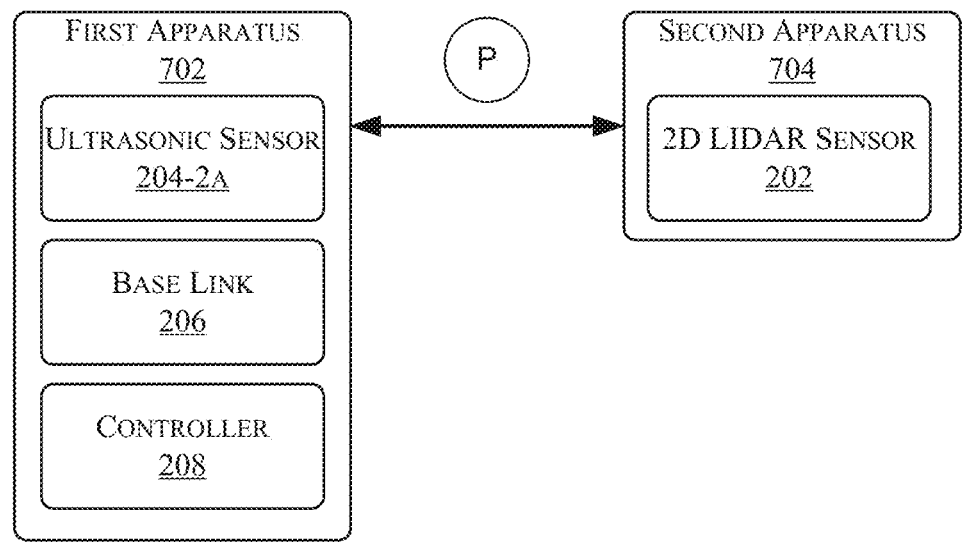
Figure 9:
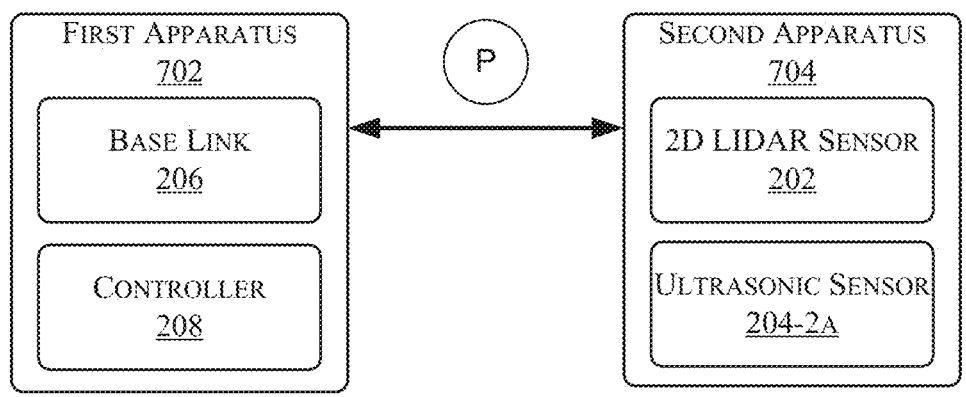

In an example, as shown in FIG. 8, the ultrasonic sensor, the base link 206, and the controller 208 may be installed or integrated with the first apparatus 702 and the 2D LIDAR sensor 202 may be installed or integrated with the second apparatus 704. In yet another example, as shown in FIG. 9, both the ultrasonic sensor 204-2a and the 2D LIDAR sensor 202 may be installed or integrated with the second apparatus 704 with the base link 206 and controller 208 on the first apparatus 702. Each of the configurations shown in FIG. 7-9 having only one base link 206 may be physically connected, similar to the payload robot 600 in FIGS. 5-6. Moreover, in these configurations, the controller 208 of the first apparatus 702 may be used to control the multi-apparatus system.

In a further example, the 2D LIDAR sensor 202 may be installed or integrated with the first apparatus 702 and the ultrasonic sensor 204-2a may be installed or integrated with the second apparatus 704, where both the first and the second apparatus 704 may be wirelessly connected. In this wireless configuration, each of these apparatuses may include its own base link 206s and controller 208s respectively. Separate base link 206s locally available with the corresponding apparatuses in the multi-apparatus system assist to keep a fixed distance between the sensors and the base link 206 for implementing the SBSM system 100. Depending on an intended task, embodiments of the SBSM system 100 may include the single apparatus, or at least one apparatus in the multi-apparatus system, being made mobile.

Further, the SBSM system 100, in one example, may assist the mobile robot 102 in performing mapping, localization, preplanning, and planning and control functions. In one embodiment, mobile robot 102 may include the controller 208 being configured to perform mapping functions using the multiplanar sensors. Mapping is the process by which a representation of an environment is created and updated from sensor data and preprogrammed input. Several maps having different levels of resolution, stability and/or coordinate systems may be maintained. Dynamic or local mapping may maintain a current 2D map of an environment surrounding the mobile robot 102. A static or global map of the environment's outer perimeter (i.e., room walls or yard boundaries) may also be created. The maps created by controller 208 may be stored in a storage device accessible by the controller 208. The iterative mapping process essentially comprises the steps of moving to a new position, collecting sensor data of the objects and obstacles in the immediate surroundings, performing localization, and updating the dynamic map to incorporate information derived from the new sensor data.

The static map may include, for example, the walls of a room or the boundaries of a building. The static map may be predetermined and input to the controller 208 or, alternatively, the controller 208 may make a static map of the environment before task performance is initiated using the SBSM system 100. In the latter case, in one embodiment, mobile robot 102 may follow a physically distinct perimeter with the controller 208 maintaining a dynamic map as the mobile robot 102 moves and incorporating perimeter information from the dynamic map into the static map. The process may continue until the static map is complete, consistent, and stable. The controller 208 may be configured with any of the suitable simultaneous localization and mapping (SLAM) methodologies known in the art including, but not limited to, GMapping based on Rao-Blackwellized particle filtering to create the global map using sensor data from the 2D LIDAR sensor 202. Once created, the static map may be permanently stored in the mobile robot 102, or in some examples, on a remote device.

The controller 208 may locate a position of the mobile robot 102 in the static map by recognizing landmarks and other physical attributes of the environment and by aligning the dynamic or local map within the static map. No origin or reference point, such as the base link 206, is required. In one embodiment, mobile robot 102 may navigate autonomously around the mapped environment. The controller 208 may perform aspects of navigation, including localization, planning and control for mobile robot 102, and in some examples, for other connected robot 102s as well. Localization is the process by which the controller 208 may determine a current position, orientation and rate of change of the robot 102 within the static map, or the dynamic map. Different procedures known in the art may be used by the controller 208 for localizing the mobile robot 102. In one example, the controller 208 may localize the mobile robot 102 using any suitable methods known in the art such as dead reckoning methodology to obtain an estimate of a change in position of the mobile robot 102 using odometry and inertial navigation systems. In order to perform autonomous navigation, the SBSM system 100 may assist in determining whether or not an object is present in one or more blind spots of the mobile robot 102 or connected sensors. Accordingly, the ultrasonic sensors 204 may assist in monitoring blind spots of the 2D LIDAR sensor 202 for detecting objects.

Figure 11:
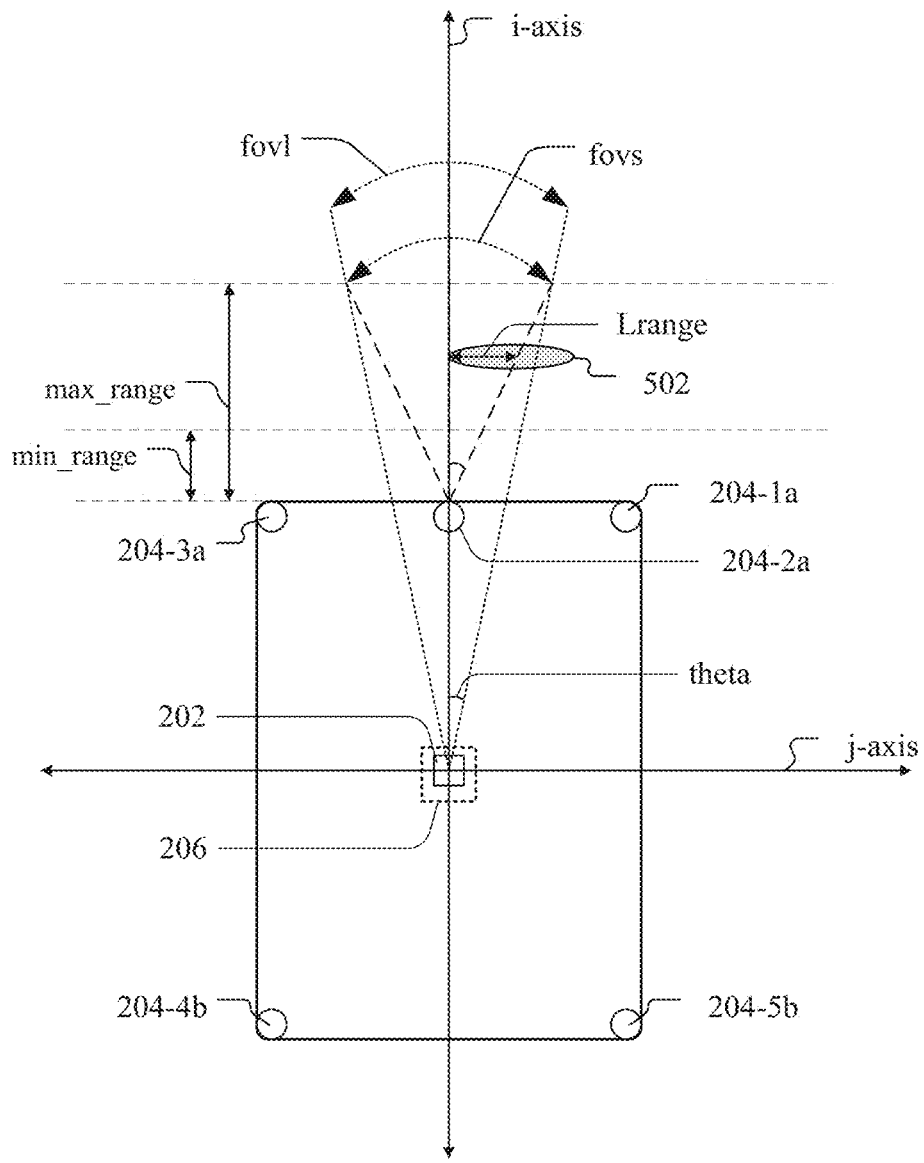
FIG. 11 is a top plan view of the mobile robot of FIG. 1 illustrating a scenario for implementing the SBSM system of FIG. 1, according to an embodiment of the present disclosure.
Figure 12A:
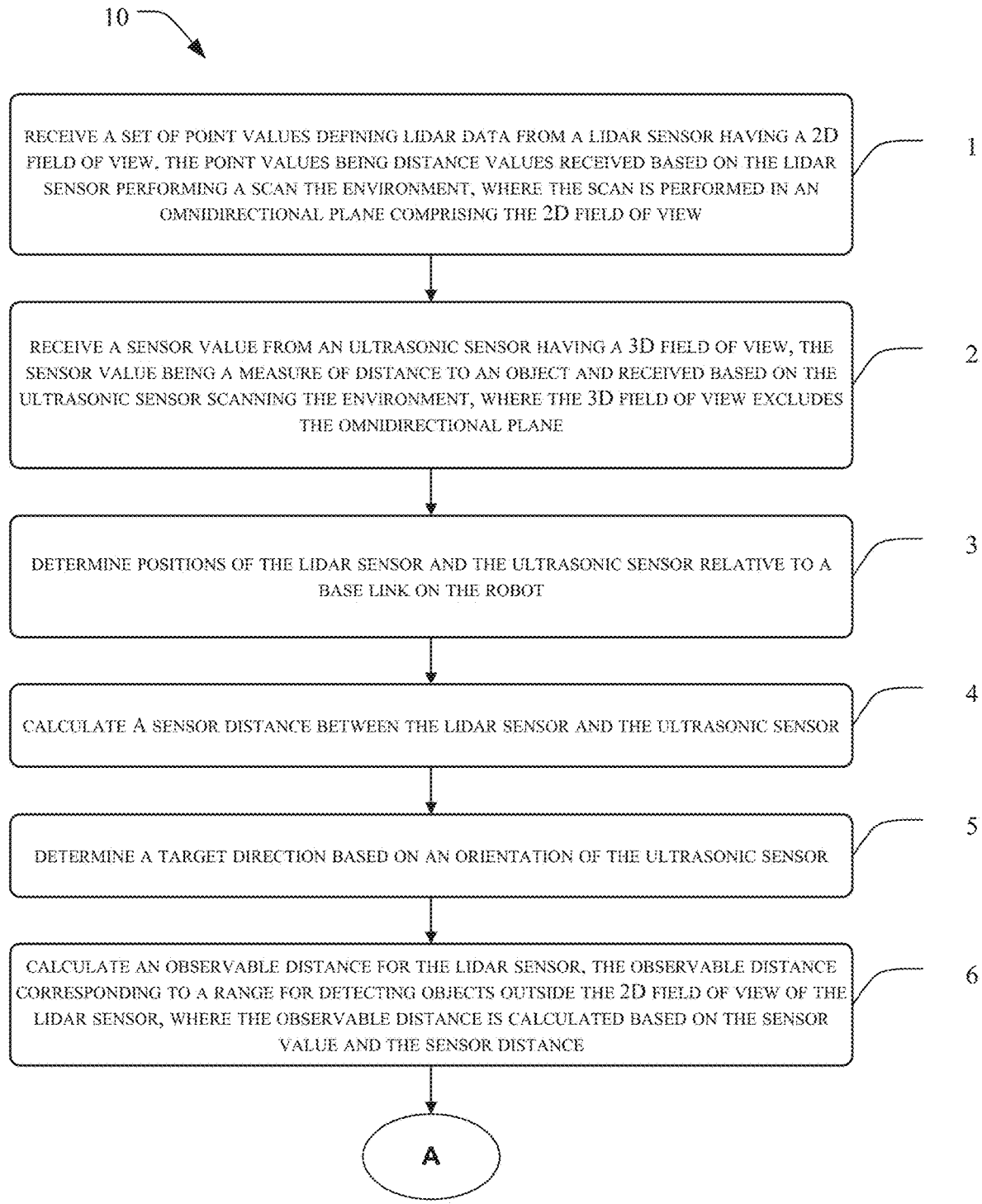
FIGS. 12A-12B are flow diagrams illustrating an exemplary method for implementing the SBSM system of FIG. 1, according to an embodiment of the present disclosure.
Figure 12B:
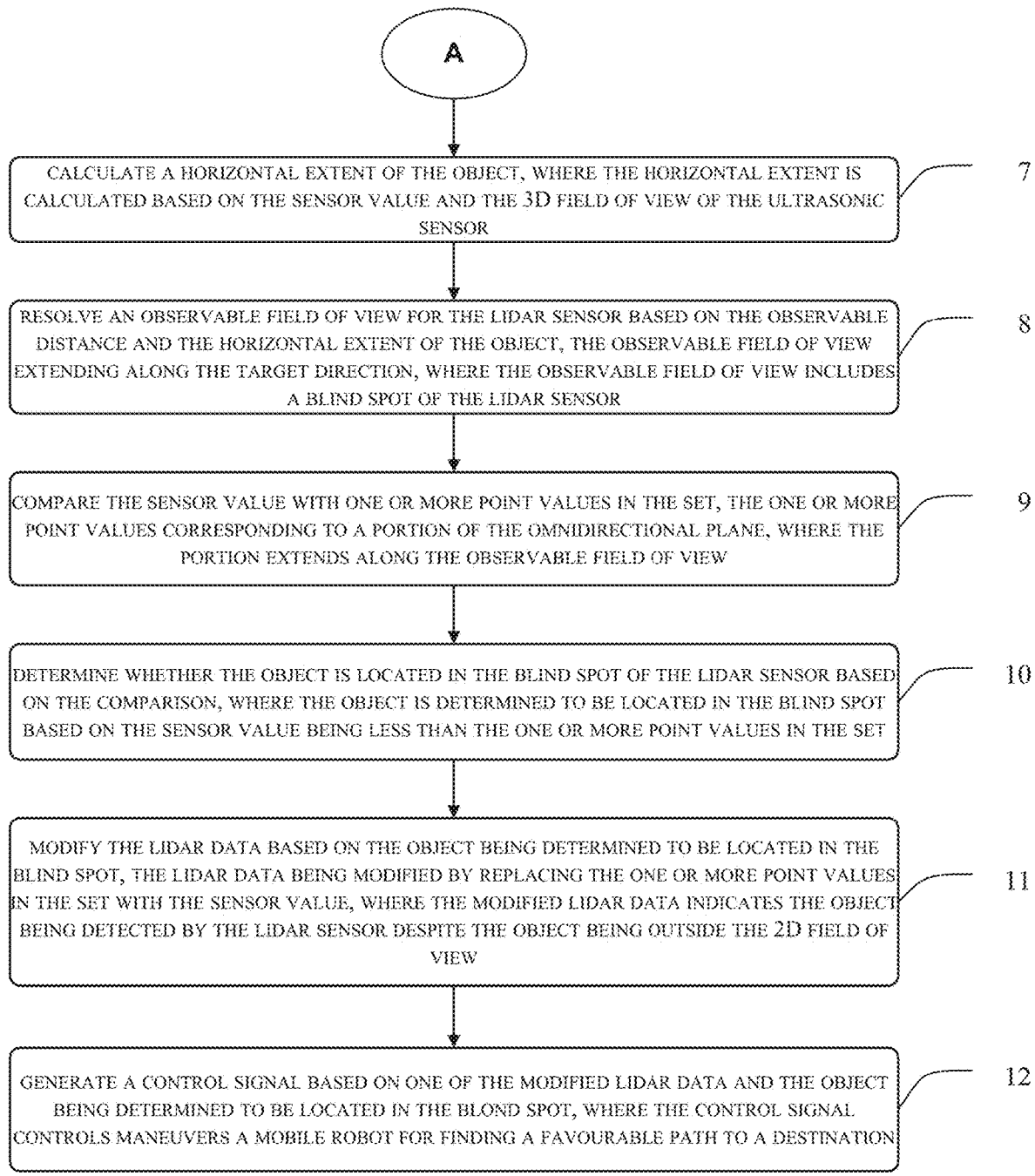

FIG. 11 is a top plan view of the mobile robot 102 of FIG. 1 illustrating a scenario for implementing the SBSM system 100 of FIG. 1, according to an embodiment of the present disclosure. The implementation of the SBSM system 100 may be explained in conjunction with FIGS. 12A-12B. In one embodiment, the controller 208 may execute the exemplary method of FIGS. 12A-12B for implementing the SBSM system 100. The order in which the method is described here is not intended to be construed as a limitation, and any number of the described method steps may be combined, deleted, or otherwise performed in any order to implement these or an alternate set of instructions without departing from the scope and spirit of the present disclosure. The exemplary instructions may be described in the general context of computer-readable instructions, which may be stored on a computer readable medium, and installed or embedded in an appropriate device for execution. Further, the instructions may be implemented in any suitable hardware, software, firmware, or combination thereof, that exists in the related art or that is later developed.

At step 1, a set of point values defining LIDAR data from a LIDAR sensor are received. The controller 208 may operate in communication with the 2D LIDAR sensor 202 of the SBSM system 100. The 2D LIDAR sensor 202 may be a rotational scanner performing an omnidirectional scan of the environment surrounding of mobile robot 102. In some examples, the 2D LIDAR sensor 202 may be a static scanner which may be physically rotated about a vertical axis relative to the mobile robot 102 for performing an omnidirectional scan of the environment. Other examples may include the 2D LIDAR sensor 202 being a static scanner which may be physically rotated with the mobile robot 102 for performing an omnidirectional scan of the environment. In one instance, the vertical axis may pass through the base link 206. The 2D LIDAR sensor 202 may scan an omnidirectional plane about the base link 206 for providing a set of point values as the LIDAR data. The omnidirectional plane may comprise the 2D field of view, or vice versa, of the 2D LIDAR sensor 202. The omnidirectional plane may span across a 2D plane parallel to a horizontal plane of the mobile robot 102.

Each of the received point values in the set may correspond to a distance to surfaces in the surrounding environment of the mobile robot 102. In one example, the LIDAR data may include 360 point values with each point value corresponding to a distance value in each one degree of the omnidirectional scan relative to the base link 206. However, in some examples, the LIDAR data may include less than 360 point values corresponding to a scan of the environment in parts. The 2D LIDAR sensor 202 may send the LIDAR data to the controller 208 or store the LIDAR data in the storage device for being fetched by the controller 208 at a later time.

At step 2, a sensor value from an ultrasonic sensor 204-2a is received. The controller 208 may operate in communication with the ultrasonic sensors 204 of the SBSM system 100. Aspects of the method are explained with reference to a single ultrasonic sensor such as the ultrasonic sensor 204-2a; however, one having ordinary skill in the art will understand that the concepts discussed herein can be extended for being implemented with the remaining ultrasonic sensors 204, 506. In one embodiment, the ultrasonic sensor 204-2a has a 3D field of view and may scan the environment in a set direction, e.g., towards a front of the mobile robot 102. The ultrasonic sensor 204-2a may return only a single sensor value based on the scan. The sensor value may provide a measure of distance to one or more objects with the 3D field of view of the ultrasonic sensor. Unlike the 2D LIDAR sensor 202 that may return multiple point values, the ultrasonic sensor 204-2a returns only a single distance value as the sensor value based on sensing one or more objects within its 3D field of view. Moreover, based on the ultrasonic sensor 204-2a and 2D LIDAR sensor 202 being located in different horizontal planes on the mobile robot 102 and oriented away from each other, the 3D field of view of the ultrasonic sensor 204-2a excludes the 2D omnidirectional plane scanned by the 2D LIDAR sensor 202. Such positions and orientations of the ultrasonic sensor 204-2a and the 2D LIDAR sensor 202 prevents the respective (i) sensor data from being noisy, (ii) scanning ranges from being reduced, and (iii) spatial extents for detecting object from being adversely limited. The ultrasonic sensor 204-2a may send such sensor value (ultrasonic data) to the controller 208 or store the sensor value in the storage device for being fetched by the controller 208 at a later time.

At step 3, positions of the LIDAR sensor and the ultrasonic sensor 204-2a are determined relative to a base link 206 on the robot 102. In one embodiment, the controller 208 may determine a yaw of the ultrasonic sensor 204-2a and the 2D LIDAR sensor 202 relative to the base link 206 for determining their respective positions on the robot 102. In the present disclosure, the term "yaw" is used within the context of its broadest definition. The "yaw" may refer to an orientation of a sensor relative to the base link 206. Such orientation may correspond to a rotational position of a sensor, such as the ultrasonic sensor, e.g., about an axis perpendicular to the base link 206, in the quaternion coordinate system. One having ordinary skill in the art will understand that any other suitable coordinate systems known in the art including the Euler coordinate system may be implemented to determine the positions of the ultrasonic sensors 204 including the ultrasonic sensor 204-2a and the 2D LIDAR sensor 202.

In the quaternion coordinate system, a rotational position may be represented using a quaternion, Q, shown in Equation 1. The quaternion Q is a hypercomplex number including a scalar part and a complex vector part.

$$Q = w + ix + jy + kz \quad (1)$$

In Equation 1, w, x, y and z are real numbers, and i, j, and k are mutually orthogonal imaginary unit vectors, which indicate axes of rotation. The term "w" refers to the scalar part and the remaining three terms form the complex vector part. Equation 1 can be normalized to reduce calculation errors and improve relational accuracy, and provide a normalized quaternion form shown in Equation 2:

$$w^2 + x^2 + y^2 + z^2 = 1 \quad (2)$$

As illustrated in FIG. 11, the positions of ultrasonic sensors 204 arranged about the base link 206 may be determined based on Equations 1-2. The controller 208 may be configured to operate with reference to the base link 206 being set as a center of an imaginary circle, where the center may correspond to an origin in the quaternion coordinate system, and the ultrasonic sensors 204 being arranged on a circumference of such imaginary circle. Hence, the controller 208 may represent a position of the ultrasonic sensor 204-2a as a rotational position or orientation thereof about the base link 206, or an axis such as the k-axis extending therethrough, in the quaternion coordinate system.

The controller 208 may determine the rotational positions based on the yaw (or an angle of rotation) of each of the ultrasonic sensors 204 about an axis perpendicular to the base link 206 using Equation 1. For example, the ultrasonic sensors 204 may be considered to rotate about the k-axis extending vertically through the base link 206. Since the orientations of ultrasonic sensors 204 do not change about the i-axis (e.g., representing roll) and about the j-axis (e.g., representing pitch), quaternion parameters x and y can be considered zero. Hence, Equation 1 and Equation 2 may reduce to Equation 3 and Equation 4 respectively.

$$Q = w + kz \quad (3)$$

$$w^2 + z^2 = 1 \quad (4)$$

The quaternion rotations of ultrasonic sensors 204 about the k-axis may be represented using the trigonometry formula shown in Equation 5:

$$\cos(\varnothing/2) + \sin(\varnothing/2) = 1 \quad (5)$$

where: $\varnothing$ = angle of rotation or yaw

Based on Equations 4-5, the scalar part w and the quaternion z may be determined as shown in Equation 6 and Equation 7 respectively.

$$w = \cos(\varnothing/2) \quad (6)$$

$$z = \sin(\varnothing/2) \quad (7)$$

$$\varnothing = 2 * \sin^{-1}(z) \quad (8)$$

In Equation 6, the scalar part w may specify the amount of rotation of an ultrasonic sensor such as the ultrasonic sensor 204-2a performed about the vector part kz, where k may specify the axis of rotation and z, shown in Equation 7, may specify a length of such axis from the base link 206 up to a plane containing the underlying sensor such as the ultrasonic sensor. Based on the Equations 6-7, the controller 208 may determine the angle of rotation or yaw, shown in Equation 8, of the sensors, such as the ultrasonic sensor, for determining the corresponding rotational positions or orientation relative to the base link 206. Similarly, the controller 208 may determine rotational positions of the remaining ultrasonic sensors 204 and the 2D LIDAR sensor 202. In the illustrated example, each of the ultrasonic sensors 204, and may have a yaw of 45 degrees and the ultrasonic sensor 204-2a may have a yaw of zero degrees by virtue of their respective rotational positions relative to the base link 206. Moreover, in the illustrated example, of the mobile robot 102 (or the payload robot 600), since a position of the 2D LIDAR sensor 202 remains unchanged about the i-axis (e.g., representing roll), about the j-axis (e.g., representing pitch), about the k-axis (representing yaw) by virtue of being located with the base link 206, the quaternion parameters x, y, z as well as the scalar part w can be considered zero.

At step 4, a sensor distance between the 2D LIDAR sensor 202 and the ultrasonic sensor 204-2a is calculated.

Figure 10:
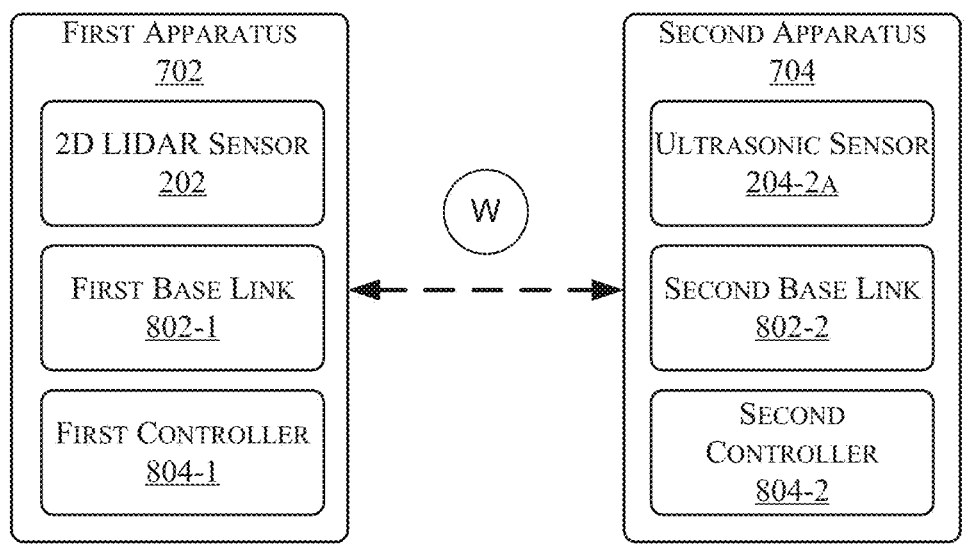

The controller 208 may calculate a distance (hereinafter referred to as sensor distance) between each of the ultrasonic sensors 204 and the 2D LIDAR sensor 202 based on their set positions with respect to the mobile robot 102 or the base link 206. As illustrated in FIG. 11, for the multiplanar sensors being located on the single apparatus, the controller 208 may determine the sensor distance based on Equation 9. In other embodiments, illustrated in FIGS. 7-10, including the multiplanar sensors being positioned in the multi-apparatus system, the controller 208 may determine or receive the sensor distance based on Equation 9 if the underlying apparatuses are connected physically. However, if the multiple apparatuses are connected wirelessly, the controller 208s of these apparatuses may communicate with each other for calculating the sensor distance. For example, as shown in FIG. 10, the first controller 804-1 of the first apparatus 702 may calculate a first distance between the 2D LIDAR sensor 202 and the first base link 802-1 based on Equation 9. Similarly, the second controller 804-2 of the second apparatus 704 may calculate a second distance between the ultrasonic sensor 204-2a and the second base link 802-2 based on Equation 9. The second controller 804-2 may then send the second distance to the first controller 804-1 over the network.

Further, the first controller 804-1 may determine a third distance between first apparatus 702 and the second apparatus 704 using any non-physical (e.g., wireless) distance measurement methods known in the art, related art, or developed later including a geographical positioning system and a proximity sensor such as the 2D LIDAR sensor 202 and radar. Consequently, the first controller 804-1 may determine the sensor distance between the 2D LIDAR sensor 202 and the ultrasonic sensor 204-2a as a sum of the first distance, the received second distance, and the third distance.

$$\text{Sensor Distance, } T = \sqrt{a^2 + b^2} \quad (9)$$

where:
a=Horizontal distance from the LiDAR sensor and to a plane containing an intended sensor such as ultrasonic sensor 204-2a
b=Vertical distance from the LiDAR sensor and to a plane containing an intended sensor such as ultrasonic sensor 204-2a Each of the ultrasonic sensors 204 and the 2D LIDAR sensor 202 may have respective predefined range and field of view. For example, as illustrated in FIG. 11, each of the ultrasonic sensors 204 may have a maximum detection range, represented as max_range, of approximately 0.5 meters, a minimum detection range, represented as min_range, of approximately 0.05 meters, and a conical 3D field of view, represented as fovs, of approximately 20 degrees along the vertical and horizontal axis, hereinafter also referred to as the second field of view. However, in some examples, the 3D field of view of the ultrasonic sensors 204 such as the ultrasonic sensor 204-2a may range from approximately 10 degrees to approximately 60 degrees. In the present disclosure, the "minimum detection range," the "maximum detection range" are used within the context of their respective broadest definitions. The minimum detection range may refer to a nearest point after which an object may be reliably detectable by a sensor. The maximum detection range may refer to a farther point up to which an object may be reliably detectable by a sensor. A region between the maximum detection range and the minimum detection range may refer to an ideal detection zone for the underlying sensor. On the other hand, in the present example, the 2D LIDAR sensor 202 may have a maximum detection range of approximately 12 meters in a 2D plane and a 2D field of view of approx. 360 degrees, hereinafter also referred to as the first field of view.

At step 5, a target direction is determined for being monitored for blind spots. In the present disclosure, the "target direction" is used within the context of its broadest definition. The target direction may correspond to a scanning direction of an intended sensor relative to the base link 206 associated with the mobile robot 102. The intended sensor selected by the controller 208 to set the target direction may depend on the sensor configured for monitoring a blind spot of another sensor or the mobile robot 102. For instance, in the illustrated example, the controller 208 may determine the target direction based on an orientation of an ultrasonic sensor such as the ultrasonic sensor 204-2a relative to the base link 206. Since the ultrasonic sensor such as the ultrasonic sensor 204-2a is used for monitoring a blind spot of the 2D LIDAR sensor 202, the controller 208 is configured for taking a scanning direction of the ultrasonic sensor 204-2a as high priority over that of the 2D LIDAR sensor 202. The target direction may extend along the scanning direction and include the 3D field of view of the ultrasonic sensor 204-2a such as the ultrasonic sensor.

At step 6, an observable distance is calculated for the LIDAR sensor. The observable distance corresponding to a range for detecting objects outside the 2D field of view of the 2D LIDAR sensor 202. The controller 208 may calculate the observable distance based on the sensor value received from an ultrasonic sensor such as the ultrasonic sensor 204-2a and the previously determined sensor distance. The observable distance may be calculated as shown in Equation 10.

$$\text{Observable Distance} = \text{sensor value} + \text{sensor distance} \quad (10)$$

At step 7, a horizontal extent of the object in the field of view of the ultrasonic sensor 204-2a is calculated. The horizontal extent may be calculated based on the sensor value and the 3D field of view of the ultrasonic sensor such as the ultrasonic sensor 204-2a.

As illustrated in FIG. 11, the horizontal extent, represented as Lrange, may refer to an observed or detected width of a portion of the object 502, e.g., within the ideal detection zone of the ultrasonic sensor. The ideal detection zone may comprise a scanning region of the ultrasonic sensor. The scanning region of the ultrasonic sensor 204-2a may defined based on a field of view and the maximum detection range of the underlying sensor such as the ultrasonic sensor. For example, as illustrated in FIG. 11, the ultrasonic sensor 204-2a may have the scanning region defined between the 3D field of view, fovs, and the maximum detection range, max_range. Hence, the horizontal extent, Lrange, may be calculated by the controller 208 based on the sensor value and the 3D field of view (fovs) of the ultrasonic sensor 204-2a in accordance with Equation 11. The sensor value may correspond to a distance to the object 502, represented as range, from the ultrasonic sensor.

$$L\text{range} = \tan(\text{fovs}) * \text{range} \quad (11)$$

At step 8, an observable field of view for the LIDAR sensor is resolved. In one embodiment, the controller 208 may resolve an observable field of view for the 2D LIDAR sensor 202 based on an ultrasonic sensor 204-2a such as the ultrasonic sensor. For example, as illustrated in FIG. 11, the controller 208 may determine the observable field of view, theta θ, for the 2D LIDAR sensor 202 based on the ultrasonic sensor 204-2a using Equations 10-11. The observable field of view, shown in Equation 12, may comprise at least a portion of the 3D field of view of the ultrasonic sensor. The observable field of view extends along the target direction.

$$\text{Observable Field of View, } \theta = \tan^{-1}(\text{Lrange/Observable Distance}) \tag{12}$$

At step 9, the sensor value is compared with one or more point values in the received LIDAR data. In one embodiment, the controller 208 may compare the sensor value with the one or more point values selected in the received LIDAR data. The selected one or more point values may correspond to a portion, represented as fovl in FIG. 11, of the omnidirectional plane or the 2D field of view of the 2D LIDAR sensor 202, where such portion may extend along the resolved observable field of view. In some examples, such portion may extend along the target direction. Moreover, the portion may comprise the 3D field of view of the ultrasonic sensor 204-2a without intersecting the 2D field of view of the 2D LIDAR sensor 202.

At step 10, whether or not the object is located in the blind spot of the 2D LIDAR sensor 202 is determined based on the comparison. In one embodiment, the controller 208 may determine an object such as the object 502 being located in the blind spot of the 2D LIDAR sensor 202 based on the sensor value being less than the one or more point values in the set, where these point values relate to the portion of the omnidirectional 2D plane extending along the resolved observable field of view.

At step 11, the received LIDAR data is modified. The controller 208 may modify the received LIDAR data including the set of point value based on the object being located in the blind spot. For example, the controller 208 may modify the LIDAR data may be modified by replacing the one or more point values in the set with the sensor value, where these points values relate to the portion of the omnidirectional 2D plane extending along the resolved observable field of view. The modified LIDAR data may indicate to the controller 208 that the object is detected by the 2D LIDAR sensor 202, similar to a condition when the object may be present within the 2D field of view of the 2D LIDAR sensor 202, despite the object being located outside the 2D field of view.

At step 12, a control signal is generated based on the modified LIDAR data. In one embodiment, the controller 208 may generate a control signal based on the LIDAR data being modified. The control signal may assist in controlling the mobile robot 102 for autonomous navigation. For example, the controller 208 may direct the control signal to, at least one of, (i) trigger a motor such as the motor 210 directly or indirectly coupled to the wheels for inhibiting speed or acceleration of the mobile robot 102 (e.g., stop the robot 102), changing an orientation of the robot 102 relative to the object (e.g., changing an orientation of the robot 102 towards a path away from the object), or changing a direction of motion of the mobile robot 102 (e.g., moving the mobile robot 102 laterally or in a reverse direction), or a combination thereof, (ii) send an alert message to a display device (or a remote computing device) operationally coupled with the mobile robot 102, and (iii) provide an alert signal or a feedback signal (e.g., audio, visual, haptic, etc.) to a user.

Figure 13:
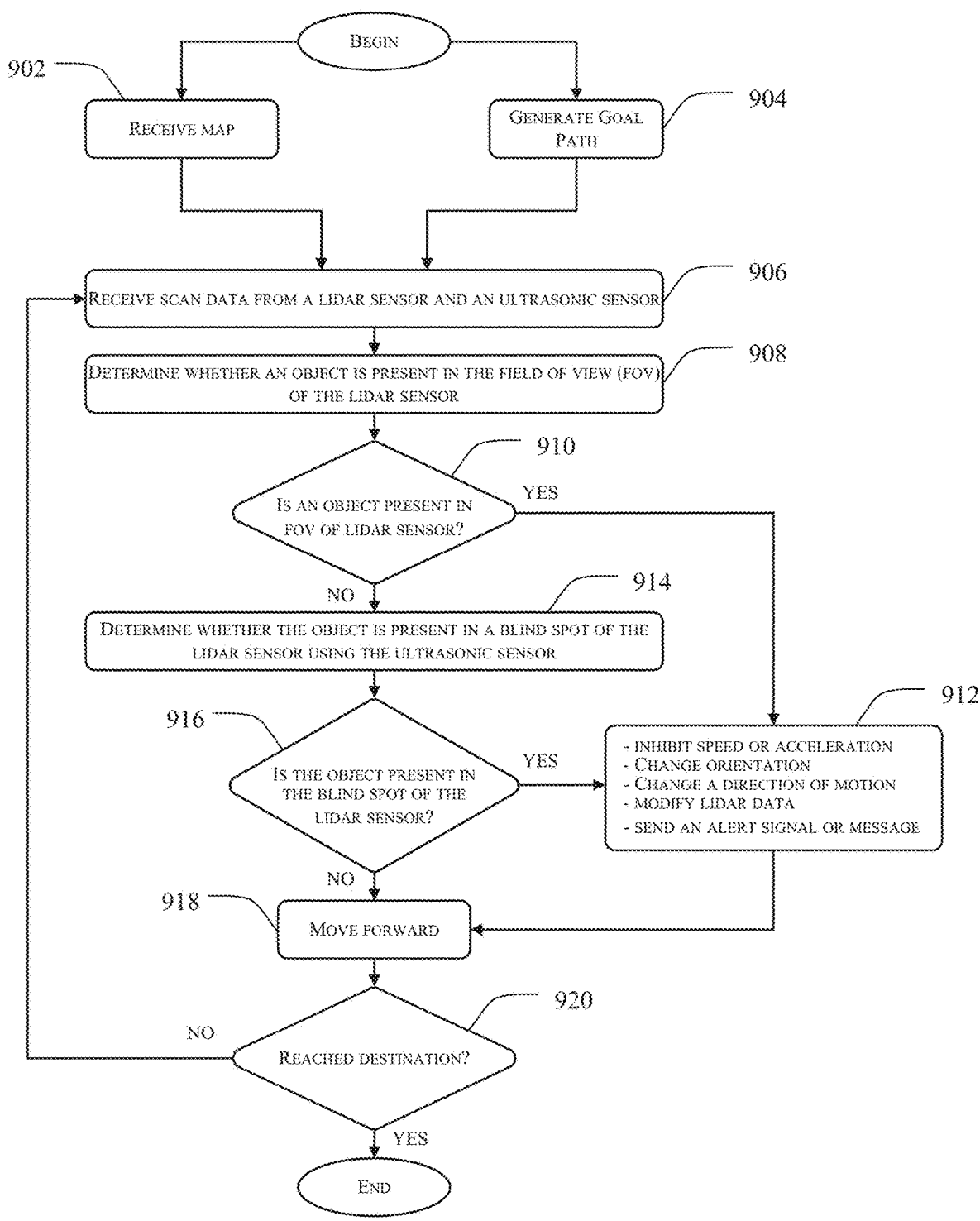
FIG. 13 is a flow diagram illustrating an exemplary method of controlling the mobile robot for autonomous navigation using the SBSM system of FIG. 1, according to an embodiment of the present disclosure.

FIG. 13 is a flow diagram illustrating an exemplary method of controlling the mobile robot 102 for autonomous navigation using the SBSM system 100 of FIG. 1, according to an embodiment of the present disclosure. In one embodiment, the controller 208 may execute the exemplary method of FIG. 13 for autonomously navigating the mobile robot 102 using the SBSM system 100. The order in which the method is described here is not intended to be construed as a limitation, and any number of the described method steps may be combined, deleted, or otherwise performed in any order to implement these or an alternate set of instructions without departing from the scope and spirit of the present disclosure. The exemplary instructions may be described in the general context of computer-readable instructions, which may be stored on a computer readable medium, and installed or embedded in an appropriate device for execution. Further, the instructions may be implemented in any suitable hardware, software, firmware, or combination thereof, that exists in the related art or that is later developed.

During operation, the mobile robot 102 may require to navigate autonomously for delivering medicines to patients or staff in different rooms within a hospital environment. The controller 208 may begin by receiving a map of the hospital environment and generate a goal path to different rooms. Beginning at step 902, the controller 208 may receive a SLAM map (e.g., global map) representing a virtual map of the hospital environment. Alternatively, the SLAM map may be subsequently retrieved from the storage device by the controller 208. At step 904, the controller 208 may generate a goal path to a hospital room as a destination from its initial pose based on the SLAM map. In some embodiments, the goal path may be generated based on a pose estimate for the mobile robot 102 using any of a variety of techniques known in the art including, but not limited to, the Time Elastic Bands (TEB) approach algorithms. Alternatively, the mobile robot 102 may receive a goal path or may retrieve a predefined goal path from the storage device. Having received the SLAM map and generated the goal path, the controller 208 may drive the mobile robot 102 to move incrementally along the goal path.

At step 906, the controller 208 may receive the LIDAR data including a set of point values from the 2D LIDAR sensor 202 based on an omnidirectional 2D scan of the local or surrounding environment for proceeding to find a pose or an orientation of the mobile robot 102 and a path to the destination, where the path may be devoid of any objects within a predefined threshold distance from the mobile robot 102. As discussed above, the local scan may comprise of a 2D LIDAR "point cloud" representing points in the 2D field of view and a sensor value indicating distance values within the 3D field of view in which obstacles may be detected by the 2D LIDAR sensor 202 and the ultrasonic sensor 204-2a respectively. The point values may represent points of the 2D LIDAR scan at a position and orientation relative to the robot 102, each point value in the LIDAR data taken at a discrete angular increment and indicating a potential obstacle at a distance from the robot 102's current position. The controller 208 may also receive the sensor value from each of the one or more ultrasonic sensors 204 such as the ultrasonic sensor 204-2a monitoring a blind spot of the 2D LIDAR sensor 202.

At step 908, the controller 208 may determine whether or not an object is present within the 2D field of view of the 2D LIDAR sensor 202. The controller 208 may determine the presence of the object based on multiple point values in the LIDAR data being less than or equal to the maximum detection range (e.g., 12 meters) of the 2D LIDAR sensor 202. At step 910, if the object is detected within the omnidirectional field of view of the 2D LIDAR sensor 202, the controller 208 may initiate step 912, discussed later, for finding a path to the destination. Else, the controller 208 may initiate step 914. In some examples, the controller 208 may initiate step 914 even when the object is detected to be present within the 360-degree field of view of the 2D LIDAR sensor 202. At step 914, the controller 208 may determine whether or not an object is present in a blind spot of the 2D LIDAR sensor 202. In the present disclosure, the term "blind spot" is used within the context of its broadest definition. The "blind spot" may refer to a region outside a field of view and/or the maximum detection range of a sensor such as the 2D LIDAR sensor 202.

In one embodiment, the controller 208 may use one or more ultrasonic sensors 204 such as the ultrasonic sensor 204-2a to monitor the blind spots of the 2D LIDAR sensor 202. For this, as discussed above, the controller 208 may resolve an observable field of view for the LIDAR sensor, where the observable field of view includes a blind spot of the 2D LIDAR sensor 202. The observable field of view may be resolved by the controller 208 based on the received sensor value and the 3D field of view of the corresponding ultrasonic sensor, as well as the sensor distance between the 2D LIDAR sensor 202 and the ultrasonic sensor. Once the observable field of view is resolved, the controller 208 may compare the sensor value with one or more point values in the LIDAR data, where these one or more point values may correspond to a portion of the omnidirectional plane or the 2D field of view of the 2D LIDAR sensor 202, where such portion may extend along the resolved observable field of view. In some examples, such portion may extend along the target direction corresponding to the scanning direction of the ultrasonic sensor 204-2a relative to the base link 206 associated with the mobile robot 102. Moreover, the portion may comprise the 3D field of view of the ultrasonic sensor 204-2a without intersecting the 2D field of view of the 2D LIDAR sensor 202. Further, the controller 208 may determine the object being located in the blind spot of the 2D LIDAR sensor 202 based on the sensor value being less than the one or more point values corresponding to the portion extending along the resolved observable field of view.

At step 916, if the object is detected to be present within the blind spot of the 2D LIDAR sensor 202, the controller 208 may initiate step 912. Else, the controller 208 may initiate step 918 for the mobile robot 102 to continue moving forward. At step 912, based on the object being detected in the blind spot, the controller 208 may modify the received LIDAR data and/or provide a control signal. The controller 208 may modify the received LIDAR data including the set of point value based on the object being present in the blind spot. In one example, the controller 208 may modify the LIDAR data by replacing the one or more point values in the set with the sensor value, where these points values relate to the portion of the omnidirectional 2D plane extending along the resolved observable field of view. The modified LIDAR data may indicate to the controller 208 that the object being detected by the 2D LIDAR sensor 202 despite the object being located outside the 2D field of view of the 2D LIDAR sensor 202. Such modification of the LIDAR data using the sensor value assists to prevent separate processing of the LIDAR data and ultrasonic data to create different local maps for finding a favorable path to the destination, thereby reducing the memory usage and data processing delay.

In another example, the controller 208 may generate a control signal based on either the modified LIDAR data or the object being detected to be present in the blind spot of the 2D LIDAR data. The control signal may maneuver or control the mobile robot 102 for finding a favorable path to the destination. For instance, the controller 208 may direct the control signal to, at least one of, (i) trigger a motor such as the motor 210 directly or indirectly coupled to the wheels for inhibiting speed or acceleration of the mobile robot 102 (e.g., slow down or stop the robot 102), changing a pose or orientation of the robot 102 relative to the object (e.g., changing an orientation of the robot 102 towards a path away from the object), or changing a direction of motion of the mobile robot 102 (e.g., moving the mobile robot 102 laterally or in a reverse direction), or a combination thereof, (ii) send an alert message to a display device (or a remote computing device) operationally coupled with the mobile robot 102, and (iii) provide an alert signal or a feedback signal (e.g., audio, visual, haptic, etc.) to a user or another device.

Once the mobile robot 102 is maneuvered, the controller 208 may initiate the step 918 after a predefined interval (e.g., ranging from approx. 1 second to approx. 10 seconds) to continue moving forward. Subsequently, the controller 208 may initiate step 920 to assess whether or not the mobile robot 102 has reached the destination. In one example, the controller 208 may determine whether the destination is reached based on the received static map or global map of the hospital environment. If the mobile robot 102 is determined to have reached the destination, the controller 208 may end or stop a movement of the mobile robot 102. Else, the controller 208 may again initiate step 906 to continuing monitoring the surrounding environment of the mobile robot 102 to find and/or follow a favorable path to the destination.

Various kinds, sizes, shapes, and materials of various components including those not necessarily depicted in the attached drawings may also be envisaged by invention(s) covered in the present disclosure. Notably, the figures and examples are not meant to limit the scope of the present disclosure to a single embodiment, but other embodiments are possible by way of interchange of some or all of the described or illustrated elements.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention(s).

We claim:

1. A method of controlling a robot for autonomous navigation, the method comprising:
receiving, by a controller, a set of point values defining light detection and ranging (LIDAR) data from a LIDAR sensor having a two-dimensional (2D) field of view, the point values being distance values received based on the LIDAR sensor performing a scan of an environment, wherein the scan is performed in an omnidirectional plane comprising the 2D field of view;
receiving, by the controller, a sensor value from an ultrasonic sensor having a three-dimensional (3D) field of view, the sensor value being a measure of distance to an object and received based on the ultrasonic sensor scanning the environment, wherein the 3D field of view excludes the omnidirectional plane;
resolving, by the controller, an observable field of view for the LIDAR sensor, wherein the observable field of view is resolved based on a sensor distance between the LIDAR sensor and the ultrasonic sensor, the received sensor value, and the 3D field of view of the ultrasonic sensor;
comparing, by the controller, the sensor value with one or more point values in the set, the one or more point values corresponding to a portion of the omnidirectional plane, wherein the portion extends along the observable field of view;

determining, by the controller, whether the object is located in a region outside the 2D field of view of the LIDAR sensor based on the comparison, wherein the object is determined to be located in the region outside the 2D field of view based on the sensor value being less than the one or more point values in the set;

modifying, by the controller, the LIDAR data based on the object being located in the region outside the 2D field of view, the LIDAR data being modified by replacing the one or more point values in the set with the sensor value, wherein the modified LIDAR data indicates the object being detected by the LIDAR sensor despite the object being located outside the 2D field of view; and generating, by the controller, a control signal based on the modified LIDAR data, wherein the control signal triggers a motor for manipulating an orientation of a robot towards a path away from the object.

2. The method of claim 1, wherein the step of resolving further comprises:

determining, by the controller, positions of the LIDAR sensor and the ultrasonic sensor relative to a base link on the robot, the base link defining a frame of reference, wherein the positions are determined based on respective yaws of the LIDAR sensor and the ultrasonic sensor about an axis perpendicular to the base link;

calculating, by the controller, the sensor distance based on the determined positions of the LIDAR sensor and the ultrasonic sensor relative to the base link;

determining, by the controller, a target direction based on an orientation of the ultrasonic sensor, wherein the target direction comprises a portion of the 3D field of view of the ultrasonic sensor;

calculating, by the controller, an observable distance for the LIDAR sensor, the observable distance corresponding to a range for detecting objects outside the 2D field of view, wherein the observable distance is calculated based on the sensor value and the sensor distance;

calculating, by the controller, a horizontal extent of the object, wherein the horizontal extent is calculated based on the sensor value and the 3D field of view of the ultrasonic sensor; and resolving, by the controller, the observable field of view for the LIDAR sensor based on the observable distance and the horizontal extent of the object, wherein the observable field of view extends along the target direction.

3. The method of claim 2, wherein the horizontal extent corresponds to a width of the object within the 3D field of view of the ultrasonic sensor.

4. The method of claim 2, wherein the positions of the LIDAR sensor and the ultrasonic sensor are fixed on the robot.

5. The method of claim 2, wherein the positions are rotational positions relative to the base link.

6. The method of claim 2, wherein the base link includes the LIDAR sensor.

7. The method of claim 2, wherein the LIDAR sensor has a yaw of zero degrees relative to the base link.

8. The method of claim 1, wherein the control signal further, at least one of, (i) triggers the motor to one of, inhibit speed or acceleration of the robot, stop a motion of the robot, move the robot along the path, and move the robot laterally or in a reverse direction, and (ii) provides an alert message or an alert signal.

9. The method of claim 1, wherein the sensor value is received based on the ultrasonic sensor scanning in a fixed direction.

10. The method of claim 1, wherein the LIDAR sensor and the ultrasonic sensor are located in different horizontal planes.

11. A system for controlling a robot for autonomous navigation, the system comprising:

a light detection and ranging (LIDAR) sensor having a two-dimensional (2D) field of view and being configured to perform a scan of an environment to provide a set of point values defining LIDAR data, the set of point values being distance values, wherein the LIDAR sensor performs the scan in an omnidirectional plane comprising the 2D field of view;

an ultrasonic sensor configured to scan the environment to provide a sensor value, the sensor value being a measure of distance to an object and received based on the ultrasonic sensor scanning the environment, wherein the ultrasonic sensor has a three-dimensional (3D) field of view excluding the omnidirectional plane; and a controller in communication with the LIDAR sensor and the ultrasonic sensor, wherein the controller is configured to:

resolve an observable field of view for the LIDAR sensor, wherein the observable field of view is resolved based on a sensor distance between the LIDAR sensor and the ultrasonic sensor, the sensor value, and the 3D field of view of the ultrasonic sensor;

compare the sensor value with one or more point values in the set, the one or more point values corresponding to a portion of the omnidirectional plane, wherein the portion extends along the observable field of view;

determine whether the object is located in a region outside the 2D field of view of the LIDAR sensor based on the comparison, wherein the object is determined to be located in the region outside the 2D field of view based on the sensor value being less than the one or more point values in the set;

modify the LIDAR data based on the object being located in the region outside the 2D field of view, the LIDAR data being modified by replacing the one or more point values in the set with the sensor value, wherein the modified LIDAR data indicates the object being detected by the LIDAR sensor despite the object being located outside the 2D field of view; and generate a control signal based on the modified LIDAR data, wherein the control signal triggers a motor for manipulating an orientation of a robot towards a path away from the object.

12. The system of claim 11, wherein the controller is further configured to:

determine positions of the LIDAR sensor and the ultrasonic sensor relative to a base link on the robot, the base link defining a frame of reference, wherein the positions are determined based on yaws of the LIDAR sensor and the ultrasonic sensor about an axis perpendicular to the base link;

calculate the sensor distance based on the determined positions of the LIDAR sensor and the ultrasonic sensor relative to the base link;

determine a target direction based on an orientation of the ultrasonic sensor, wherein the target direction comprises a portion of the 3D field of view of the ultrasonic sensor;

calculate an observable distance for the LIDAR sensor, the observable distance corresponding to a range for detecting objects outside the 2D field of view, wherein the observable distance is calculated based on the sensor value and the sensor distance;

calculate a horizontal extent of the object, wherein the horizontal extent is calculated based on the sensor value and the 3D field of view of the ultrasonic sensor; and resolve the observable field of view for the LIDAR sensor based on the observable distance and the horizontal extent of the object, wherein the observable field of view extends along the target direction.

13. The system of claim 12, wherein the horizontal extent corresponds to a width of the object within the 3D field of view of the ultrasonic sensor.

14. The system of claim 12, wherein the positions of the LIDAR sensor and the ultrasonic sensor are fixed on the robot.

15. The system of claim 12, wherein the positions are rotational positions relative to the base link.

16. The system of claim 12, wherein the base link includes the LIDAR sensor.

17. The system of claim 12, wherein the LIDAR sensor has a yaw of zero degrees relative to the base link.

18. The system of claim 11, wherein the control signal further, at least one of, (i) triggers the motor for one of, inhibiting speed or acceleration of the robot, stopping a motion of the robot, moving the robot along the path, and moving the robot laterally or in a reverse direction, and (ii) provides an alert message or an alert signal.

19. The system of claim 11, wherein the sensor value is received based on the ultrasonic sensor scanning in a fixed direction.

20. The system of claim 11, wherein the LIDAR sensor and the ultrasonic sensor are located in different horizontal planes.

* * * * *